US012804588B2

(12) United States Patent
Peng et al.

(10) Patent No.: US 12,804,588 B2
(45) Date of Patent: Nov. 17, 2026

(54) SYSTEMS AND METHODS FOR CARRIER AGGREGATION BASED POSITIONING

(71) Applicant: ZTE Corporation, Shenzhen (CN)

(72) Inventors: Focai Peng, Shenzhen (CN); Chuangxin Jiang, Shenzhen (CN); Mengzhen Li, Shenzhen (CN); Cong Wang, Shenzhen (CN); Qi Yang, Shenzhen (CN); Junpeng Lou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 138 days.

(21) Appl. No.: 18/768,634

(22) Filed: Jul. 10, 2024

(65) Prior Publication Data

US 2025/0175930 A1 May 29, 2025

Related U.S. Application Data

(63) Continuation of application No. PCT/CN2023/076825, filed on Feb. 17, 2023.

(51) Int. Cl.
*H04W 64/00* (2009.01)
*H04L 5/00* (2006.01)

(52) U.S. Cl.
CPC ........... *H04W 64/00* (2013.01); *H04L 5/0048* (2013.01)

(58) Field of Classification Search
CPC ............................ H04W 64/00; H04L 5/0048
See application file for complete search history.

(56) References Cited

U.S. PATENT DOCUMENTS

2021/0329414 A1 10/2021 Yerramalli et al.
2022/0069959 A1 3/2022 Zarifi
2022/0209997 A1* 6/2022 Manolakos ....... H04W 72/0446
2022/0369270 A1 11/2022 Jiang et al.
2025/0175304 A1* 5/2025 Zhang .................. H04W 76/14

FOREIGN PATENT DOCUMENTS

CN 114727221 A 7/2022
CN 115152252 A 10/2022
WO WO-2022/197678 A1 9/2022

OTHER PUBLICATIONS

3GPP TS 38.321 V17.2.0, 2022, 3rd Generation Partnership Project; Technical Specification Group Radio Access Network; NR; Medium Access Control (MAC) protocol specification, Release 17, 2022, 246 Pages.

(Continued)

*Primary Examiner* — Justin Y Lee
(74) *Attorney, Agent, or Firm* — Foley & Lardner LLP

(57) ABSTRACT

Presented are systems and methods for carrier aggregation based positioning. A user equipment (UE) may receive configuration information regarding transmission of a plurality of reference signals for positioning over a plurality of component carriers from a network. The UE may receive a media access control (MAC) control element (CE) indicating aggregation of the plurality of reference signals from the network. The UE may send the plurality of reference signals over one or more of the plurality of component carriers that are being aggregated to the network.

20 Claims, 15 Drawing Sheets

(56) References Cited

OTHER PUBLICATIONS

3GPP TS 38.455 V17.1.1, 3rd Generation Partnership Project; Technical Specification Group Radio Access Network; NG-RAN; NR Positioning Protocol A (NRPPa) Release 17, 2022, 198 Pages.
Extended Search Report issued for European Patent Application No. 23895680.9 dated Sep. 1, 2025 (10 pages).
Office Action for JP App. No. 2024-541181 dated Oct. 30, 2025 (with English translation, 7 pages).
International Search Report and Written Opinion for PCT Appl. No. PCT/CN2023/076825, dated Sep. 18, 2023 (8 pages).
Moderator (Ericsson), "Output #1 of email discussion [101-e-NR-Pos-02] on DL PRS and UL SRS for NR positioning in rel 16 maintenance", 3GPP TSG-RAN WG1 Meeting #100-e, R1-2004909, e-Meeting, Jun. 5, 2020 (68 pages).

* cited by examiner

SYSTEMS AND METHODS FOR CARRIER AGGREGATION BASED POSITIONING

CROSS-REFERENCE TO RELATED APPLICATION

This application claims the benefit of priority under 35 U.S.C. § 120 as a continuation of International Patent Application No. PCT/CN2023/076825, filed on Feb. 17, 2023, the disclosure of which is incorporated herein by reference in its entirety.

TECHNICAL FIELD

The disclosure relates generally to wireless communications, including but not limited to systems and methods for carrier aggregation based positioning.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A user equipment (UE) may receive configuration information regarding transmission of a plurality of reference signals for positioning over a plurality of component carriers from a network. The UE may receive a media access control (MAC) control element (CE) indicating aggregation of the plurality of reference signals from the network. The UE may send the plurality of reference signals over one or more of the plurality of component carriers that are being aggregated to the network. The MAC CE may include an "R" field. When the R field is set to "1," the plurality of reference signals on multiple activated SRS resources over the plurality of component carries can be configured to be transmitted at a same time.

In some embodiments, the MAC CE may include an "R" field. When the R field is set to "1," the plurality of reference signals on multiple activated SRS resources over a subset of the plurality of component carries can be configured to be aggregated.

In some embodiments, the MAC CE may include an "R" field. When the R field is set to "1," the plurality of reference signals on multiple activated SRS resources over all of the plurality of component carries can be configured to be aggregated.

In some embodiments, the MAC CE may include an "R" field. When the R field is set to "1," the plurality of reference signals on multiple activated SRS resource sets over a subset of the plurality of component carries can be configured to be transmitted at a same time. Respective spatial relations of the subset of the component carriers can be also indicated by the MAC CE.

In some embodiments, the MAC CE may include an "R" field and an "SUL" field. The R field and the SUL field can be configured to indicate which of the plurality of component carries that carry an SRS are configured to be transmitted at a same time. The MAC CE may include an "R" field and an "SUL" field. The R field can be configured to indicate whether to aggregate the one or more component carriers. The SUL field can be configured to indicate a number of the one or more aggregated component carriers.

In some embodiments, the MAC CE may include a "Positioning SRS Resource Set ID" field. Spatial relations of all of the plurality of reference signals can be indicated by the Positioning SRS Resource Set ID field. The MAC CE may include a "Resource IDi" field. When a first bit of the Resource IDi is set to "1," the plurality of component carriers can be configured to be transmitted at a same time.

In some embodiments, the MAC CE may include an "SRS Resource Set ID" field and a "Pathloss Reference RS ID" field. A first one of the plurality component carriers indicated by the SRS Resource Set ID field and a second one of the plurality component carriers indicated by the Pathloss Reference RS ID field can be configured to be aggregated. The MAC CE may include an "R" field, an "SRS Resource's Cell ID" field, and/or a "Serving Cell $ID_i$" field. When the R field on a first octet is set to "1," a first one of the plurality component carriers associated with the SRS Resource's Cell ID field and a second one of the plurality component carriers associated with the Serving Cell $ID_i$ field can be configured to be aggregated.

In some embodiments, the MAC CE may include a first "R" field on a first octet and a second "R" field on a second octet. The first R field and the second R field can be configured to indicate the one or more aggregated component carriers. The MAC CE may include five "R" fields that start an octet and three "$C_i$" fields that end the octet. Each of the five R fields can be set as "0" for reserved bits. Each of the three $C_i$ fields can be set as "1" for indicating a corresponding one of the component carriers to be aggregated.

In some embodiments, the MAC CE may include an "R" field, an "A/D" field, and/or a "Serving Cell ID" field. When the R field is set to "1" and the A/D field is set to "1," a component carrier indicated by the Serving Cell ID field can be configured to be aggregated The configuration information may indicate that if a measurement gap (MG) is configured for a first one of the component carriers while no MG is configured for other ones of the component carriers, the MG can be configured to be applied to the one or more aggregated component carriers.

In some embodiments, the configuration information may indicate that only one PPW is effective while other PPWs are not effective. Each of the one or more aggregated component carriers can be configured with a respective PPW. The configuration information may indicate if only one PPW is configured for a PFL while other PFLs are not configured with PPW, the configured PPW can be applied for all PFLs being aggregated. Each of the aggregated one or more component carries may have a first identification for data transmission and a second identification for positioning.

In some embodiments, the configuration information may indicate a TEG for a primary component carrier (PCC), or a primary serving cell applied for the one or more aggregated component carriers. The configuration information may indicate a carrier aggregation specific TEG applied for the one or more aggregated component carriers. The configuration information may include a UE capability report indicating a TEG applied for a whole of the one or more aggregated component carriers. The configuration information may indicate a PEG with minimum phase error applied for all the one or more aggregated component carriers. The configuration information may include a UE capability report indicating a PEG applied for all of the one or more aggregated component carriers.

In some embodiments, the configuration information may indicate that when multiple PFLs, each of which is with one MG, are aggregated, the MG on a first one of the PFLs can be applied while the MGs on the other PFLs are not effective. The configuration information may indicate if one PPW is activated for a PFL while other PPWs on respective PFLs are not activated, the activated PPW can be applied for all PFLs being aggregated.

In some embodiments, the configuration information may indicate if one PPW is activated for a PFL while other PPWs on respective PFLs are not activated, the activated PPW can be shared by other PFLs being aggregated.

In some embodiments, a wireless communication node may determine configuration information regarding transmission of a plurality of reference signals for positioning over a plurality of component carriers. The wireless communication node may measure the plurality of reference signals. The wireless communication node may report a measurement result on the plurality of reference signals over one or more of the plurality of component carriers that are being aggregated. The wireless communication node may transmit a media access control (MAC) control element (CE) that has one or more "R" fields indicating aggregation of the plurality of reference signals.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
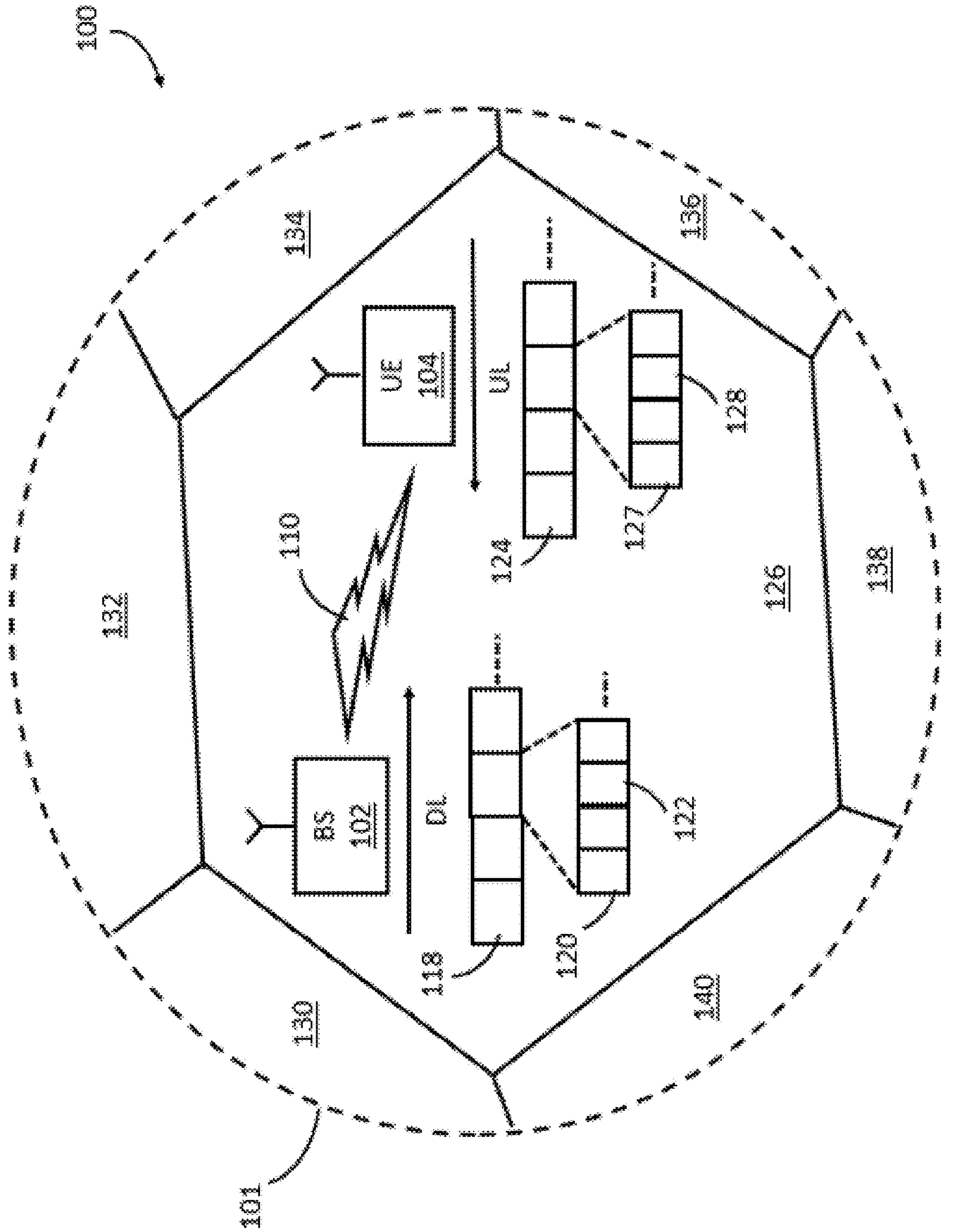
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
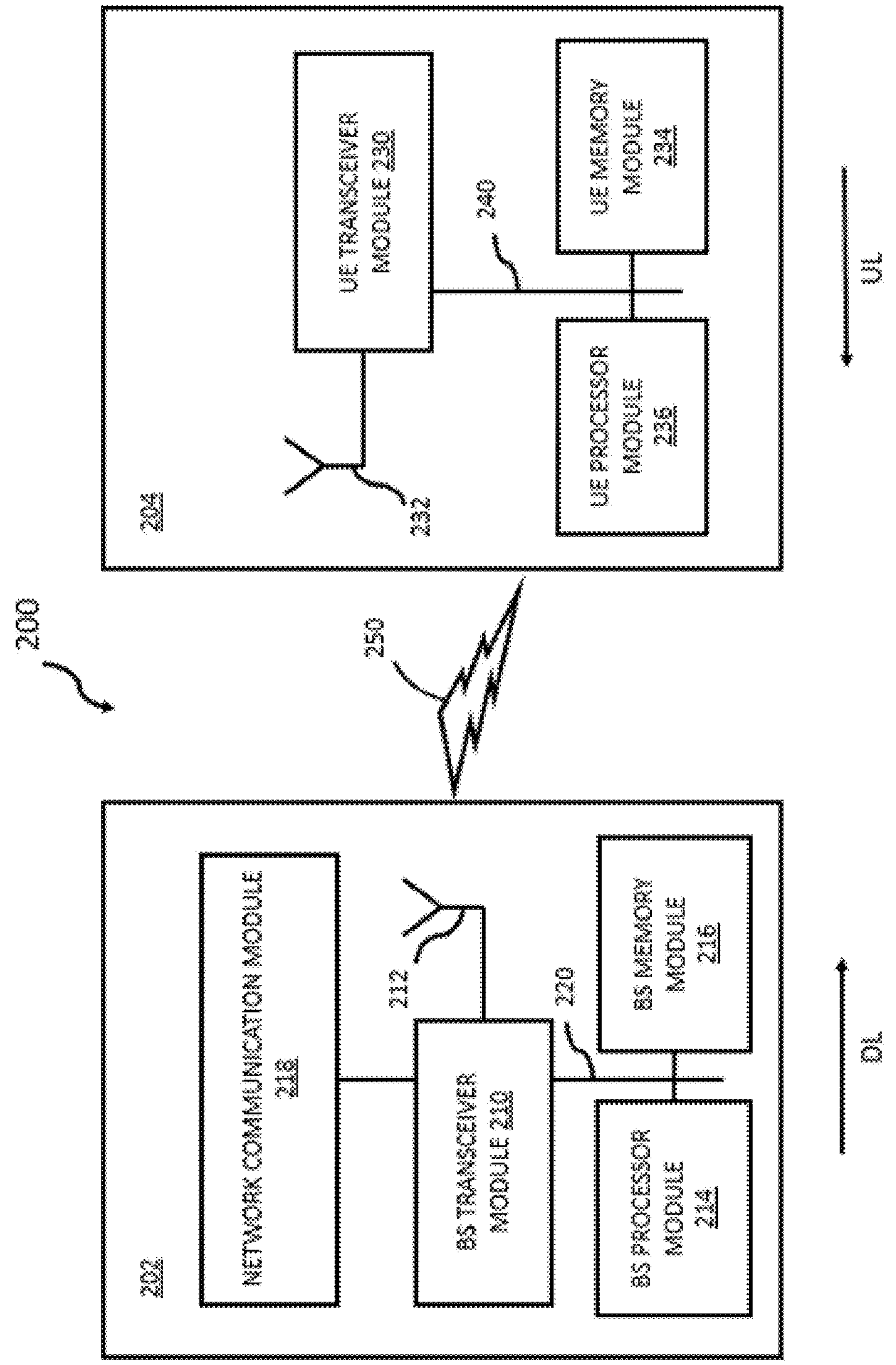
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Carrier Aggregation Based Positioning

A demand for positioning is rising up. For example, in a park (especially, an underground park), it may not be easy to find a car (especially, during busy hour). The 5th generation mobile communication system (e.g., 5G, new radio access technology, or 5G-NR) may provide a method for positioning (e.g., positioning reference signal (PRS, from a base station (e.g., gNB)) and/or sounding reference signal (SRS, from a user equipment (UE)) on a radio side. However, the PRS/SRS can be bandwidth limited (e.g., it can only be transmitted within a carrier, e.g., within 100 MHz). The positioning accuracy can be in proportion to the bandwidth of the measured reference signal. If the bandwidth of the PRS/SRS can be enlarged, the positioning accuracy can be improved. This disclosure is related to extension of the bandwidth of the PRS/SRS (e.g., with carrier aggregation (CA)).

Figure 3:
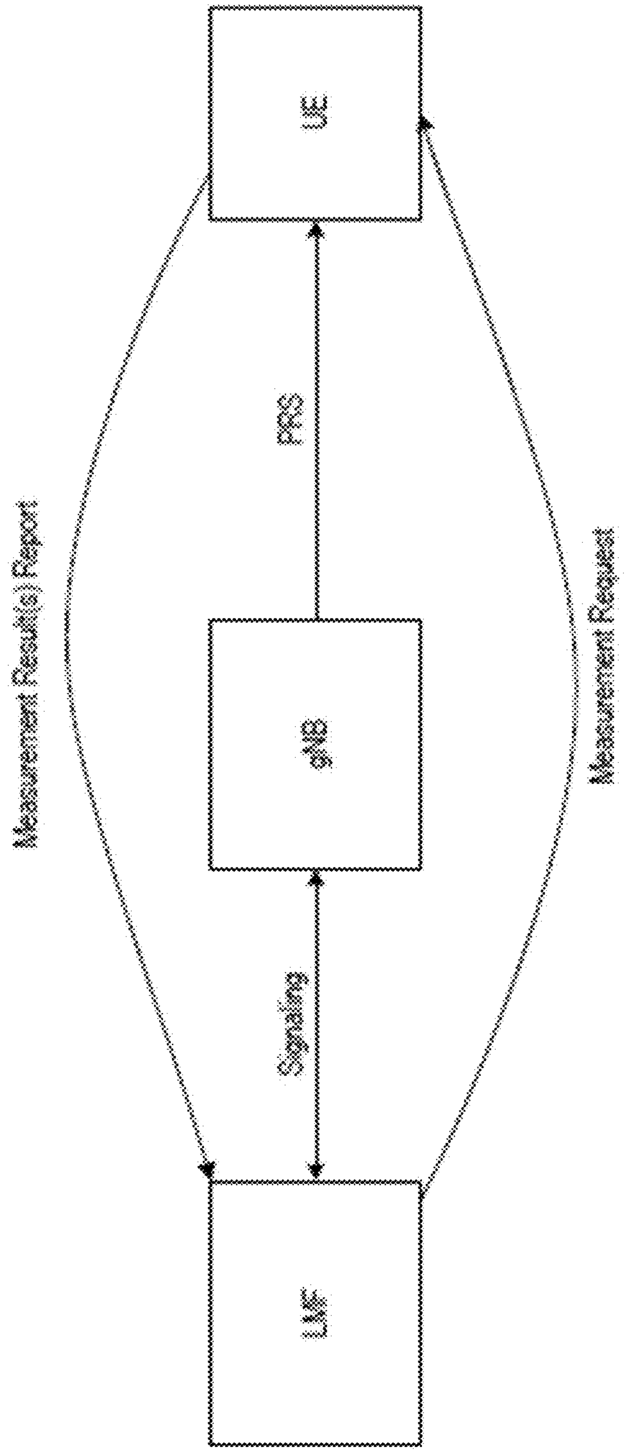
FIG. 3 illustrates an example implementation of a carrier aggregation based positioning, in accordance with some embodiments of the present disclosure.

This disclosure relates to a radio communication about how to perform positioning with large bandwidth. In a downlink (DL) as shown in FIG. 3, a positioning reference signal (PRS) can be transmitted by one or multiple gNBs. In order to achieve a "good" positioning accuracy, multiple gNBs can be involved (e.g., three base stations). A UE may measure at least one PRS. The UE may report measurement result(s) to a network (e.g., a Location Management Function (LMF) in a core network (CN) or a 5G CN (5GC)). A network element may include at least one of: a gNB, a CN, or a UE.

Figure 4:
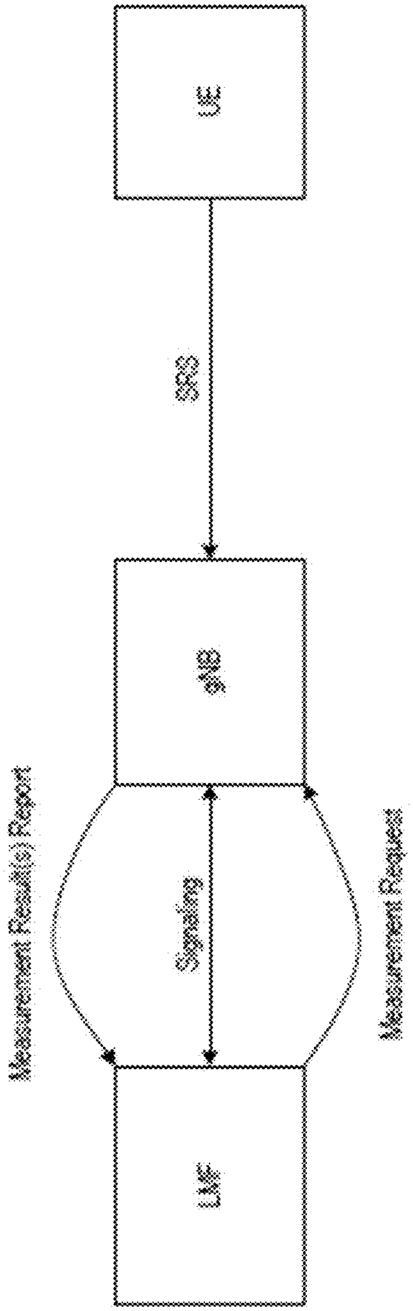
FIG. 4 illustrates an example implementation of a carrier aggregation based positioning, in accordance with some embodiments of the present disclosure.

In an uplink (UL) as shown in FIG. 4, a sounding reference signal (SRS) can be transmitted by a UE. One or more gNBs (e.g., multiple gNBs) may measure the SRS. The one or more gNBs may report measurement result(s) to a network (e.g., a LMF).

Both PRS and SRS for purpose of positioning can be transmitted within a carrier. Hence, its positioning accuracy is limited.

For a data transmission, aggregation of multiple component carriers (CC) (e.g., carrier aggregation (CA)) can be introduced to achieve a high bandwidth. The CA can be an aggregation within a frequency band (intra-band CA) or inter-frequency band (inter-band CA). The principle of CA may be also applied to PRS and SRS for purpose of positioning. This disclosure can provide a method for higher positioning accuracy after CA.

Implementation Example 1

This implementation example takes a UL-SRS as description. The principle can also be applied to a DL-PRS. A network (e.g., gNB) can configure one (or more) SRS resource (set) for positioning for a UE on one carrier (or multiple carriers). If two (or more) SRS from different carriers are transmitted at the same time, this case can be the CA of SRS for positioning. However, this case does not happen till now.

Figure 5:
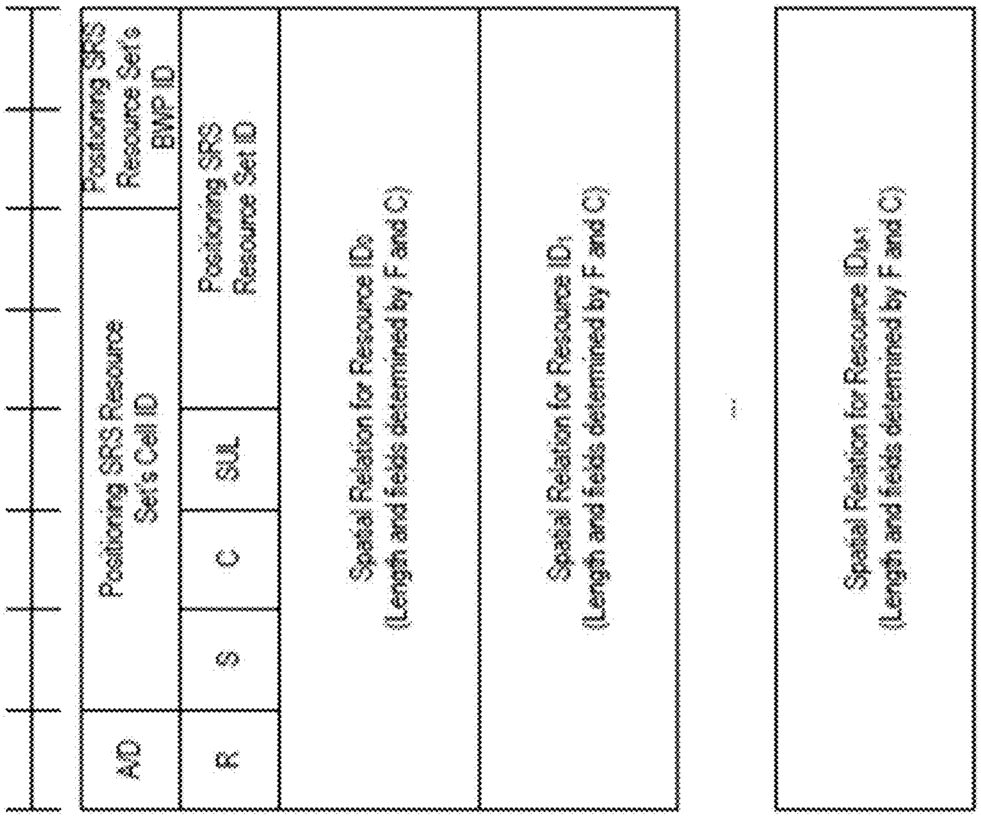
FIG. 5 illustrates an example implementation of a sounding reference signal (SRS) resource (set) with a medium access control (MAC) control element (MAC CE), in accordance with some embodiments of the present disclosure.

A network (e.g., gNB) can activate/de-activate one (or more) SRS resource (set) with a medium access control (MAC) control element (CE, MAC CE) as shown in FIG. 5. In the horizon direction, it can be 8 bits of an octet. In the vertical direction, it can be bit fields for different function. The "A/D" may indicate whether to activate or de-activate indicated semi-persistence (SP) positioning SRS resource set. The "Positioning SRS Resource Set's Cell ID" can be the identity of the Serving Cell of positioning SRS resource. The "Positioning SRS Resource Set's BWP ID" can be a UL bandwidth part (BWP) ID as an indicator of a codepoint on a downlink control information (DCI). The "R" can be for reserved bit (e.g., set as "0"). The "S" may indicate whether the fields Spatial Relation for Resource IDi for the positioning SRS resource i within the positioning SRS resource set are present. The "C" may indicate whether the octets containing Resource Serving Cell ID field(s) and Resource BWP ID field(s) within the field Spatial Relation for Resource ID i are present. The "SUL" may indicate whether the MAC CE applies to the normal UL (NUL) carrier or supplement UL (SUL) carrier configuration. The "Positioning SRS Resource Set ID" may indicate the SP Positioning SRS Resource Set. The field "Spatial Relation for Resource IDi" can be for spatial relation for resource ID i.

The higher layer (e.g., a location management function (LMF), a gNB, a radio resource control (RRC) layer, or a RRC of a gNB) can configure multiple carriers/cells/serving cells for a UE for PRS reception (or SRS transmission). A carrier/cell/serving cell can have multiple PRS/SRS resources (or resources sets). In some embodiments, the higher layer can configure association between carriers that can be aggregated. Optionally, a carrier for SRS/PRS (i.e., positioning) can be different from that for communication (i.e., a carrier used for physical shared channel that carries data). Optionally, a carrier (or cell) can have two ID: one for data transmission (e.g., serving cell ID, carrier ID, physical cell identity (PCI)) and one for positioning (e.g., for SRS/PRS transmission/reception). Optionally, a same carrier (or cell) can have two ID: one for data transmission and one for positioning even these two related signal(s)/channel(s) are transmitted at the same time. Optionally, the ID can be physical layer ID (e.g., PCI for data transmission, physical ID for positioning). Optionally, the ID can be configured by higher layer (e.g., a RRC of a gNB, e.g., configured as PCI+Offset, where the PCI can be PCI for data transmission, the Offset can be an integer, such as 1010).

If the field "R" is set to non-reserved bit (e.g., set as "1"), multiple carriers may be transmitted at the same time (e.g., CA, or bandwidth aggregation). If the field "R" is set to "1", multiple SRS on multiple carriers may be transmitted at the same time (e.g., CA of SRS). Optionally, if the field "R" is set to "1", multiple SRS on multiple SRS resources over multiple carriers may be transmitted at the same time. Optionally, if the field "R" is set to "1", multiple SRS on multiple SRS resources sets over multiple carriers may be transmitted at the same time. Optionally, if the field "R" is set to "1", multiple SRS on multiple activated/deactivated SRS resources sets over multiple carriers may be transmitted at the same time. Optionally, if the field "R" is set to "1", multiple SRS on multiple activated/deactivated SRS resources sets over multiple carriers may be activated at the same time.

In some embodiments, if one UE is configured with multiple carriers (e.g., 3) and the field "R" is set to "1", multiple SRS on multiple activated SRS resources sets over all the carriers (e.g., all the 3 carriers) may be transmitted at the same time. Optionally, if one UE is configured with multiple carriers (e.g., 3) and the field "R" is set to "1", multiple SRS on multiple activated SRS resources sets over a sub-set of the carriers (e.g., carrier #1 and #2 or, carrier #2 and #3 or, carrier #1 and #3) may be transmitted at the same time. In some embodiments, a network (e.g., gNB) can configure some sets of carrier to be aggregated (e.g., carrier set of {carrier #1, #2}, {carrier #2, #3}, e.g., by higher layer signaling). An indication may indicate which set is to be aggregated (e.g., a higher layer signaling, a MAC CE with a "R" field of "1", or a downlink control information).

In some embodiments, if the field "R" is set to "1", multiple SRS on multiple activated SRS resources sets over multiple carriers whose carriers have spatial relation as indicated in this MAC CE may be transmitted at the same time. A carrier can be a cell or a serving cell. The cell or the serving cell can be a carrier. Optionally, if the field "R" is set to "1", multiple SRS on multiple activated SRS resources sets over multiple carriers whose carriers have identical spatial relation as indicated in this MAC CE may be transmitted at the same time.

The field "SUL" can serve the same function as that of the field "R". For example, if one UE is configured with multiple carriers (e.g., 3) and the field "SUL" is set to "1", multiple SRS on multiple activated SRS resources sets over a sub-set of the carriers (e.g., carrier #1 and #2 or, carrier #2 and #3 or, carrier #1 and #3) may be transmitted at the same time. Optionally, the combination of the field "R" and the field "SUL" can serve more function than that of the field "R" as the following table. The combination of the field "R" and the field "SUL" can indicate which carriers that carry SRS may be transmitted at the same time.

TABLE 1

| Field "R" | Field "SUL" | Function |
|---|---|---|
| 0 | 0 | Reserved or not available (N/A). |
| 0 | 1 | For a UE which can be configured with SUL and there can be SRS configuration on it, it can be reserved or N/A.<br>For a UE which can be configured with SUL and there can be no SRS configuration on it, a sub-set of the carriers may be transmitted at the same time (e.g., NUL carrier #1 and NUL carrier #3).<br>For a UE which cannot be configured with SUL, a sub-set of the carriers may be transmitted at the same time (e.g., NUL carrier #1 and NUL carrier #4). |
| 1 | 0 | A sub-set of the carriers may be transmitted at the same time (e.g., carrier #2 and carrier #4). |
| 1 | 1 | All the carriers that carry SRS may be transmitted at the same time. |

The SRS/PRS aggregation can be identical to CA of SRS/PRS, carrier aggregation, or carrier aggregation of SRS/PRS. In some embodiments, there can be some field "R" in the field "Spatial Relation for Resource IDi". These fields "R" can be used to indicate which carriers that carry SRS may be transmitted at the same time. Optionally, the field "R" (and/or other field, e.g., "SUL") can indicate that the carrier indicated by the field "Positioning SRS Resource Set's Cell ID" may not be carrier-aggregated while the other carriers can be aggregated (e.g., because this carrier can be too busy). For example, for a UE configured with three inband contiguous carriers (where the carrier #1 is indicated by the field "Positioning SRS Resource Set's Cell ID"), carrier #2 and carrier #3 can be aggregated. The SRS on carrier #2 and carrier #3 can be transmitted at the same time (e.g., CA of SRS).

In some embodiments, the field "R" can indicate whether (the carriers that carry) SRS is/are aggregated or not while the field "SUL" can indicate number of aggregated carriers (e.g., "0" for first two carriers are aggregated, "1" for all the carriers are aggregated). Optionally, after carrier aggregation (e.g., the field "R" is set as "1"), the spatial relation for all the SRS on SRS resources (sets) can follow that of SRS indicated by the "Positioning SRS Resource Set ID" field. Optionally, a UE can be configured with multiple PFL/carriers for PRS/SRS. Optionally, only one PPW can be configured for these PFL/carriers (e.g., on the first PFL, or a PFL with cell ID=0). Optionally, only one PPW can be configured for a PFL/carrier while the other PFL/carrier(s) may not be configured with PPW, this PPW can be applied for all these PFL/carriers. Optionally, only one PPW can be configured for a PFL/carrier while the other PFL/carrier(s) may not be configured with PPW, then this PPW can be applied for all these PFL/carriers when all these PFL/carriers are aggregated. Optionally, only one PPW can be configured for a PFL/carrier while the other PFL/carrier(s) may not be configured with PPW, then this PPW can be applied for all these PFL/carriers when all these PFL/carriers are transmitted. Optionally, when these multiple PFL/carriers are aggregated, this PPW can be applied for all these PFL/carriers. Optionally, when these multiple PFL/carriers are transmitted at the same time, this PPW can be applied for all these PFL/carriers.

In some embodiments, a MAC CE can indicate which PFL/carrier/cell are associated to be aggregated. Optionally, a MAC CE can indicate which PFL/carrier/cell are associated to be transmitted at the same time.

The UE may transmit SRS on multiple carriers indicated in the MAC CE above. One or more gNBs may receive SRS with multiple carriers from the UE. The gNB may measure positioning relate information (e.g., timing related information). The gNB may report a measurement result to a network (e.g., LMF). The network (e.g., LMF) may calculate a location of the UE.

Figure 6:
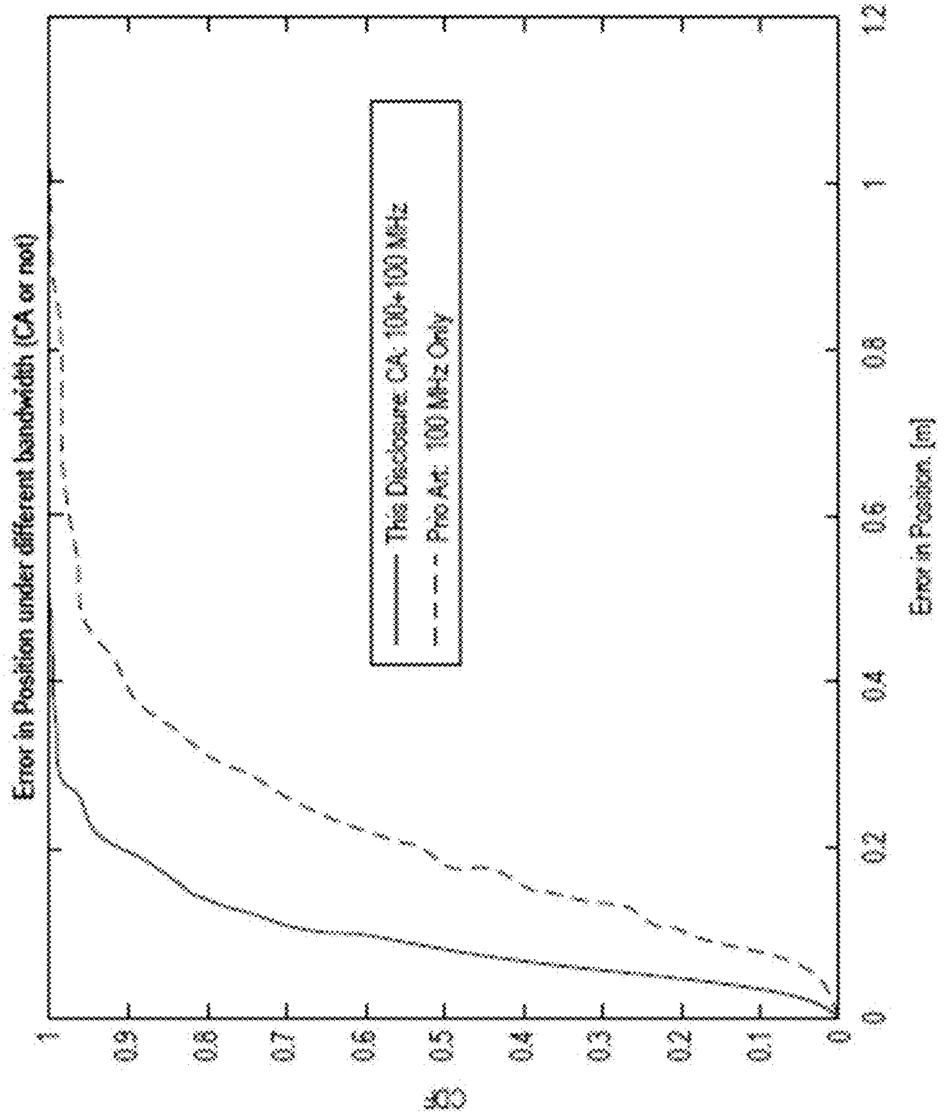
FIG. 6 illustrates an example simulation of a carrier aggregation based positioning, in accordance with some embodiments of the present disclosure.

With this method, the SRS carrier aggregation can be indicated without additional signaling overhead while the spatial relation for SRS resource can still be maintained. With SRS carrier aggregation, the positioning accuracy can be improved from 0.386m@CDF=90% to 0.195m@CDF=90% as shown in FIG. 6. The simulation settings can be carrier frequency=3.5 GHz, CC1=CC2=100 MHz, Indoor Factory with Sparse clutter, and High base station height (InF-SH).

Implementation Example 2

This implementation example takes a UL-SRS as description. The principle can also be applied to a DL-PRS.

Figure 7:
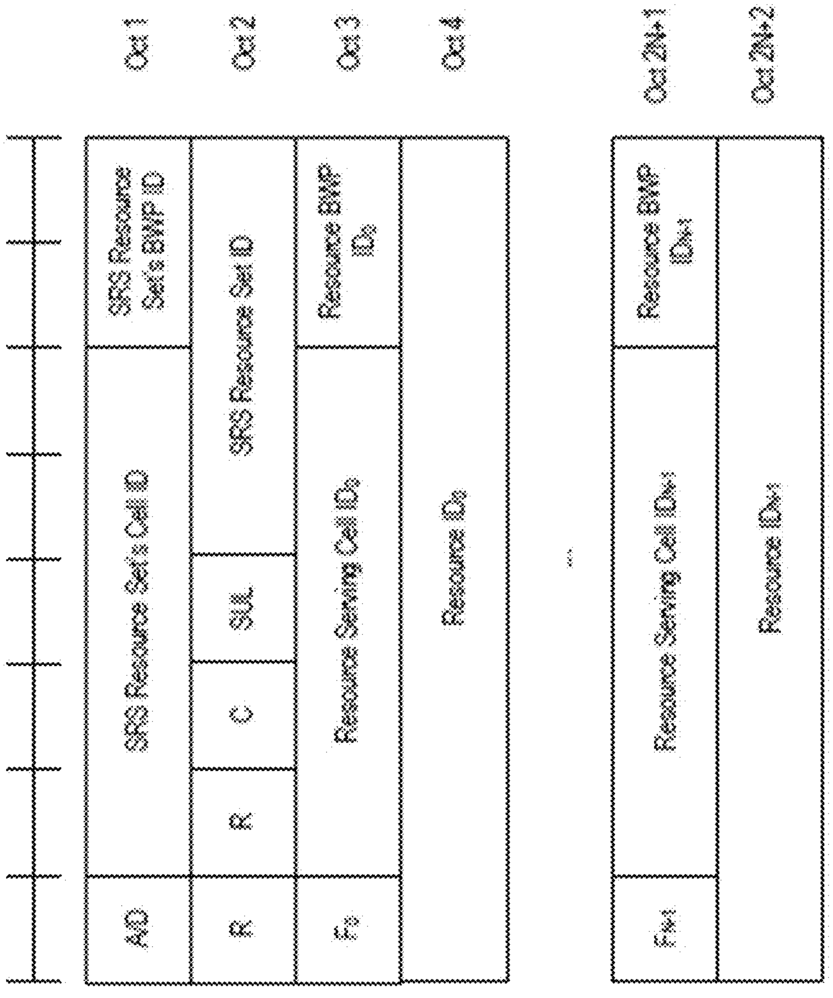
FIG. 7 illustrates an example implementation of a sounding reference signal (SRS) resource (set) with a medium access control (MAC) control element (MAC CE), in accordance with some embodiments of the present disclosure.

A network (e.g., gNB) can indicate a spatial relationship for SRS resource (set) with a MAC CE as shown in FIG. 7. The "Resource Serving Cell IDi" field may indicate the identity of the Serving Cell on which the resource used for spatial relationship derivation for SRS resource i is located. The "Resource IDi" field can contain an identifier of the resource used for spatial relationship derivation for SRS resource i.

In some embodiments, if the field "R" is set to "1", multiple carriers for SRS may be transmitted at the same time (e.g., CA). Optionally, if the field "R" is set to "1", the carriers (note: a carrier can be a cell, a cell can be a carrier) indicated by the field "Resource Serving Cell IDi" may be transmitted at the same time. Optionally, if the field "R" is set to "1", the SRS on the carriers indicated by the field "Resource Serving Cell IDi" may be transmitted at the same time. Optionally, if the field "R" is set to "1", the SRS on the SRS resource (set) on the carriers indicated by the field "Resource Serving Cell IDi" may be transmitted at the same time.

In some embodiments, the first bit (or, left-most bit) of the "Resource IDi" field can be used for indication of CA of SRS. Optionally, the first two bits (or, left-most two bits) of the "Resource IDi" field can be used for indication of CA of SRS. Optionally, if the first bit of the "Resource IDi" field is set to "1", multiple carriers for SRS may be transmitted at the same time (e.g., CA).

In some embodiments, if the first two bits of the "Resource IDi" field can be used to indicate that multiple carriers for SRS can be transmitted at the same time as Table 2.

TABLE 2

| The first bit | The second bit | Function |
|---|---|---|
| 0 | 0 | Reserved or not available (N/A). |
| 0 | 1 | A sub-set of the carriers may be transmitted at the same time (e.g., NUL carrier #1 and NUL carrier #3). |
| 1 | 0 | A sub-set of the carriers may be transmitted at the same time (e.g., carrier #2 and carrier #3). |
| 1 | 1 | All the carriers that carry SRS may be transmitted at the same time. |

With this method, the SRS carrier aggregation can be indicated without additional signaling overhead while the spatial relation for SRS resource can still be maintained.

Implementation Example 3

This implementation example takes a UL-SRS as description. The principle can also be applied to a DL-PRS.

Figure 8:
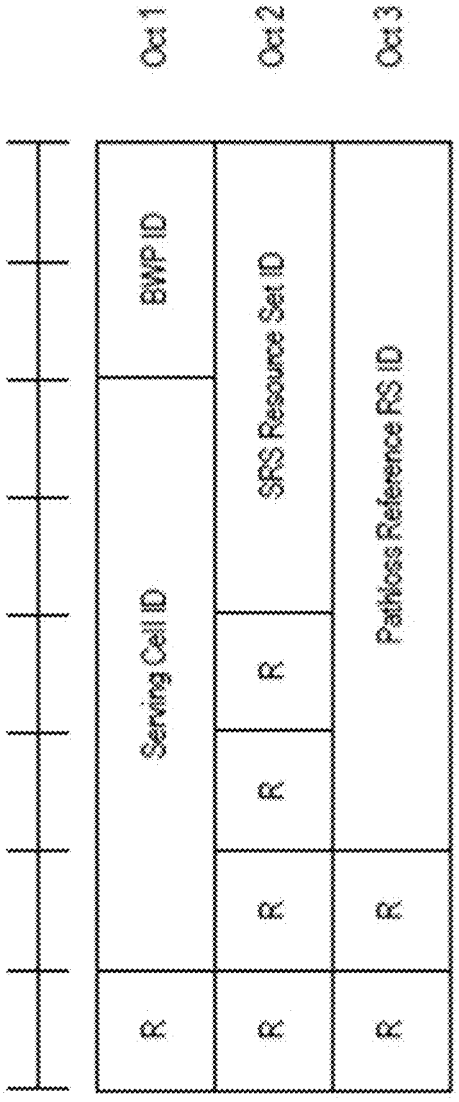
FIG. 8 illustrates an example implementation of a sounding reference signal (SRS) resource (set) with a medium access control (MAC) control element (MAC CE), in accordance with some embodiments of the present disclosure.

A network (e.g., gNB) can indicate SRS pathloss reference RS (resource) ID with a MAC CE as shown in FIG. 8. The "Pathloss Reference RS ID" field can indicate the Pathloss Reference RS ID. The SRS indicated by "SRS Resource Set ID" can be aggregated with the SRS on the carrier (or cell) indicated by the "Pathloss Reference RS ID" field. Optionally, the SRS indicated by "SRS Resource Set ID" can be aggregated with the SRS on the carrier (or cell) associated with the "Pathloss Reference RS ID" field. Optionally, the SRS indicated by "SRS Resource Set ID" and the SRS on the carrier (or cell) associated with the "Pathloss Reference RS ID" field can be transmitted at the same time.

In some embodiments, for the SRS (resources) indicated by this MAC CE which are aggregated, the SRS (resources) can apply the same pathloss reference (e.g., as the same to that indicated by "SRS Resource Set ID"). With this method, the SRS carrier aggregation can be indicated without additional signaling overhead while the spatial relation for SRS resource can still be maintained.

Implementation Example 4

This implementation example takes a UL-SRS as description. The principle can also be applied to a DL-PRS.

Figure 9:
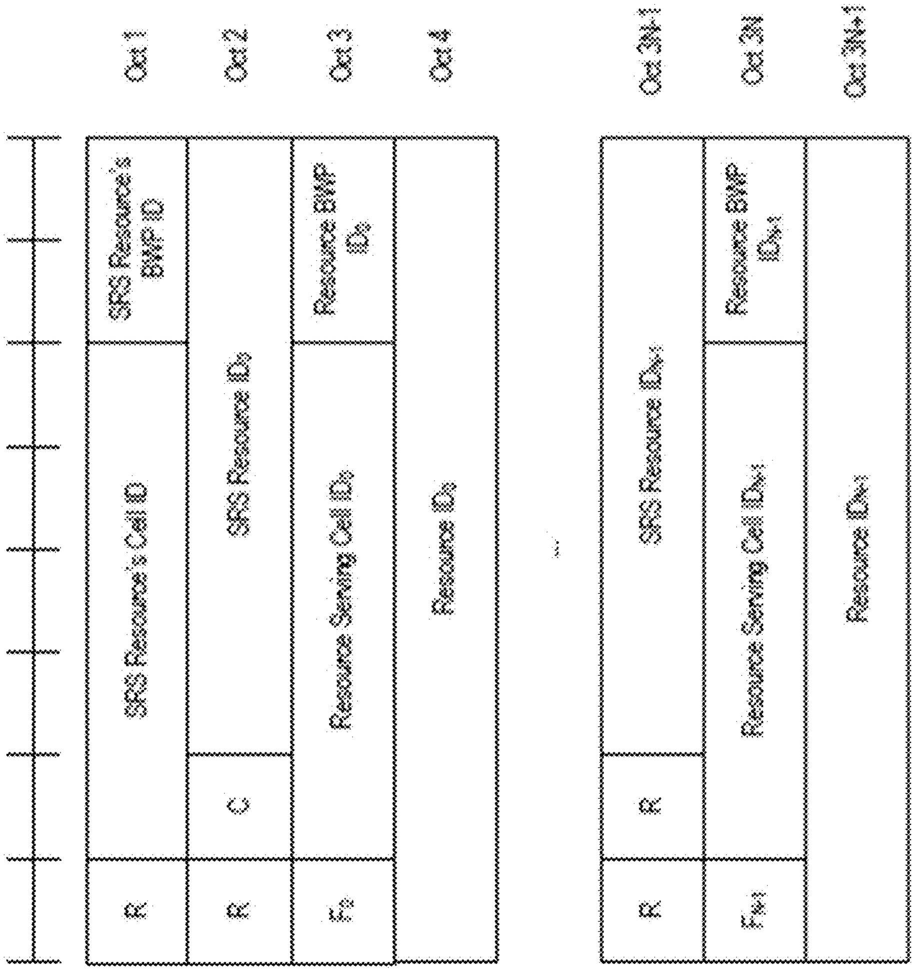
FIG. 9 illustrates an example implementation of a sounding reference signal (SRS) resource (set) with a medium access control (MAC) control element (MAC CE), in accordance with some embodiments of the present disclosure.

A network (e.g., gNB) can indicate SRS spatial relationship (with a RS resource ID on a cell/carrier) with a MAC CE as shown in FIG. 9. The "Resource Serving Cell IDi" field can indicate the identity of the Serving Cell on which the resource used for spatial relationship derivation for SRS Resource IDi is located. The cell (or carrier), which is associated with "SRS Resource's Cell ID," and the cell (or carrier), which is associated with the "Resource Serving Cell Idi," can be aggregated. Optionally, the SRS on the cell (or carrier), which is associated with "SRS Resource's Cell ID," and the SRS on the cell (or carrier), which is associated with the "Resource Serving Cell Idi," can be aggregated.

Optionally, if the field "R" on the first octet (Oct 1) is set to "1", the SRS on the cell (or carrier), which is associated with "SRS Resource's Cell ID," and the SRS on the cell (or carrier), which is associated with the "Resource Serving Cell Idi," can be aggregated. Optionally, if the field "R" on the second octet (Oct 2) is set to "1", the SRS on the cell (or carrier), which is associated with "SRS Resource's Cell ID," and the SRS on the cell (or carrier), which is associated with the "Resource Serving Cell Idi," can be aggregated (e.g., these SRS can be transmitted simultaneously). Optionally, for the SRS (resources) indicated by this MAC CE which are aggregated, the SRS (resources) can apply the same spatial relationship (e.g., as the same to that indicated by "Resource ID 0"). Optionally, the field "R" on the first octet (Oct 1) and the field "R" on the second octet (Oct 2) can indicate that a sub-set of cell (or carrier) can be aggregated as table 3.

TABLE 3

| The field "R" on Oct 1 | The field "R" on Oct 2 | Function |
|---|---|---|
| 0 | 0 | Reserved or not available (N/A). |
| 0 | 1 | A sub-set of the carriers may be transmitted at the same time (e.g., NUL carrier #1 and NUL carrier #2). |
| 1 | 0 | A sub-set of the carriers may be transmitted at the same time (e.g., carrier #3 and carrier #4). |
| 1 | 1 | All the carriers that carry SRS may be transmitted at the same time. |

With this method, the SRS carrier aggregation can be indicated without additional signaling overhead while the spatial relation for SRS resource can still be maintained.

Implementation Example 5

This implementation example can be applied to a UL-SRS and/or a DL-PRS.

Figure 10:
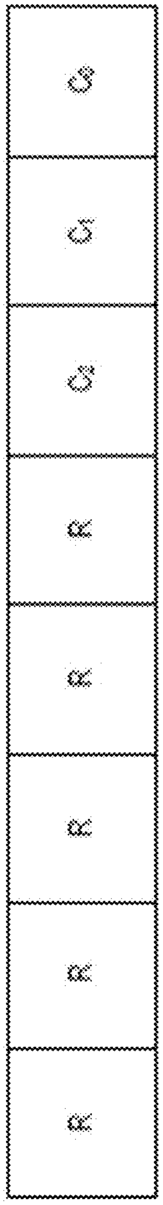
FIG. 10 illustrates an example implementation of a medium access control (MAC) control element (MAC CE), in accordance with some embodiments of the present disclosure.

A network (e.g., gNB) can indicate SRS/PRS simultaneous transmission with a MAC CE as shown in FIG. 10. The field "R" can be for reserved bit (e.g., set as "0"). The field "$C_0$", "$C_1$", "$C_2$" can be for a first, second, third carrier (or cell, or serving cell), respectively.

If the field "$C_0$" (or "$C_1$", or "$C_2$") is set as "1", this carrier may be aggregated. Otherwise, this carrier may not be aggregated. Optionally, if the field "$C_0$" (or "$C_1$", or "$C_2$") is set as "1", the SRS (or PRS) on this carrier may be aggregated. Optionally, if the field "$C_0$" (or "$C_1$", or "$C_2$") is set as "1", the SRS (or PRS) resource (set) on this carrier may be activated and the SRS (or PRS) on this carrier can be aggregated. The SRS/PRS on carriers indicated by the field "$C_0$" (or "$C_1$", or "$C_2$") may be transmitted at the same time.

In some embodiments, a network (e.g., gNB) can indicate SRS/PRS simultaneous transmission with a MAC CE as $RRRRRC_2C_1R$ where $C_0$ can be aggregated (or transmitted at the same time), or $RRRRC_3C_2C_1C_0$, or $RRRC_4C_3C_2C_1C_0$, or $RRRC_4C_3C_2C_1R$, or $RRC_5C_4C_3C_2C_1C_0$, or $RRC_5C_4C_3C_2C_1R$, $RC_6C_5C_4C_3C_2C_1C_0$, or $RC_6C_5C_4C_3C_2C_1R$.

Figure 11:
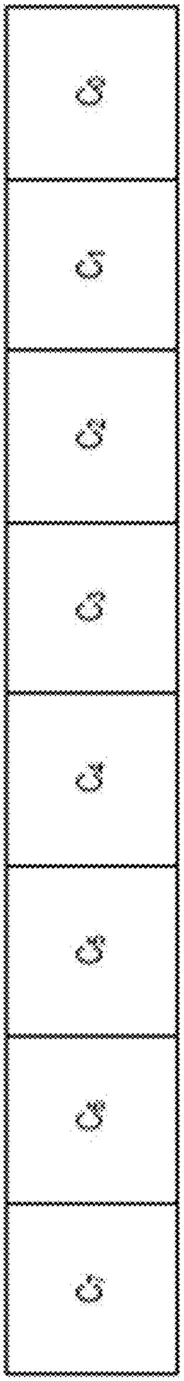
FIG. 11 illustrates an example implementation of a medium access control (MAC) control element (MAC CE), in accordance with some embodiments of the present disclosure.

In some embodiments, a network (e.g., gNB) can indicate SRS/PRS simultaneous transmission with a MAC CE as shown in FIG. 11. This MAC CE can support 8 carriers aggregation for positioning.

Figure 12:
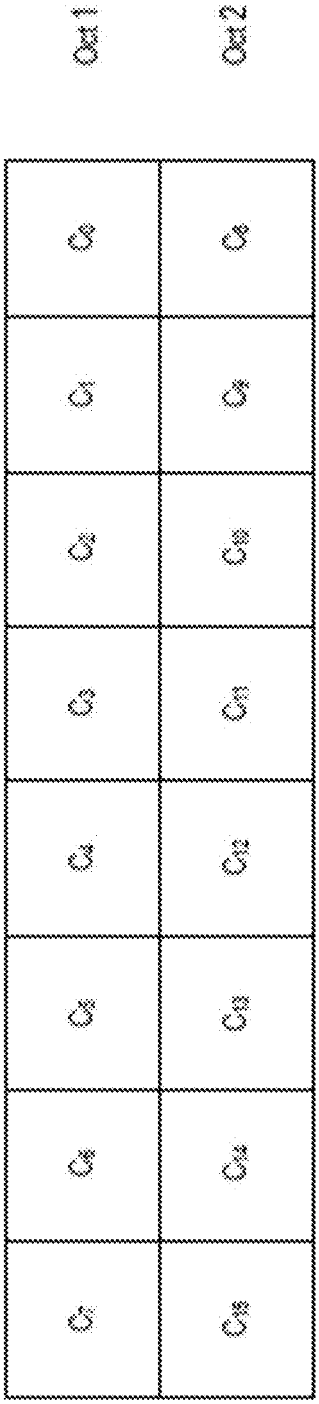
FIG. 12 illustrates an example implementation of a medium access control (MAC) control element (MAC CE), in accordance with some embodiments of the present disclosure.

A network (e.g., gNB) can indicate SRS/PRS simultaneous transmission with a MAC CE as $C_7C_6C_5C_4C_3C_2C_1R$. For this configuration, the carrier $C_0$ can be aggregated. This MAC CE can support 8 carriers aggregation for positioning. Optionally, a network (e.g., gNB) can indicate SRS/PRS simultaneous transmission with a MAC CE as shown in FIG. 12. This MAC CE can support 16 carriers aggregation for positioning.

Optionally, one or more fields can be replaced by "R" field. For example, the field "$C_0$" can be replaced by "R" field (reserved bit, set as "0"). For another example, the field "$C_{14}$" and "$C_{15}$" can be replaced by "R" field. Optionally, a MAC CE can indicate an association between carriers that can be aggregated. Optionally, a field "R" can indicate which carrier/cell may be aggregated.

With this method, the SRS/PRS carrier aggregation can be indicated with large flexibility (three or more carriers). Hence, the positioning accuracy can be improved.

Implementation Example 6

This implementation example takes a DL-PRS as description. The principle can also be applied to a UL-SRS.

Figure 13:
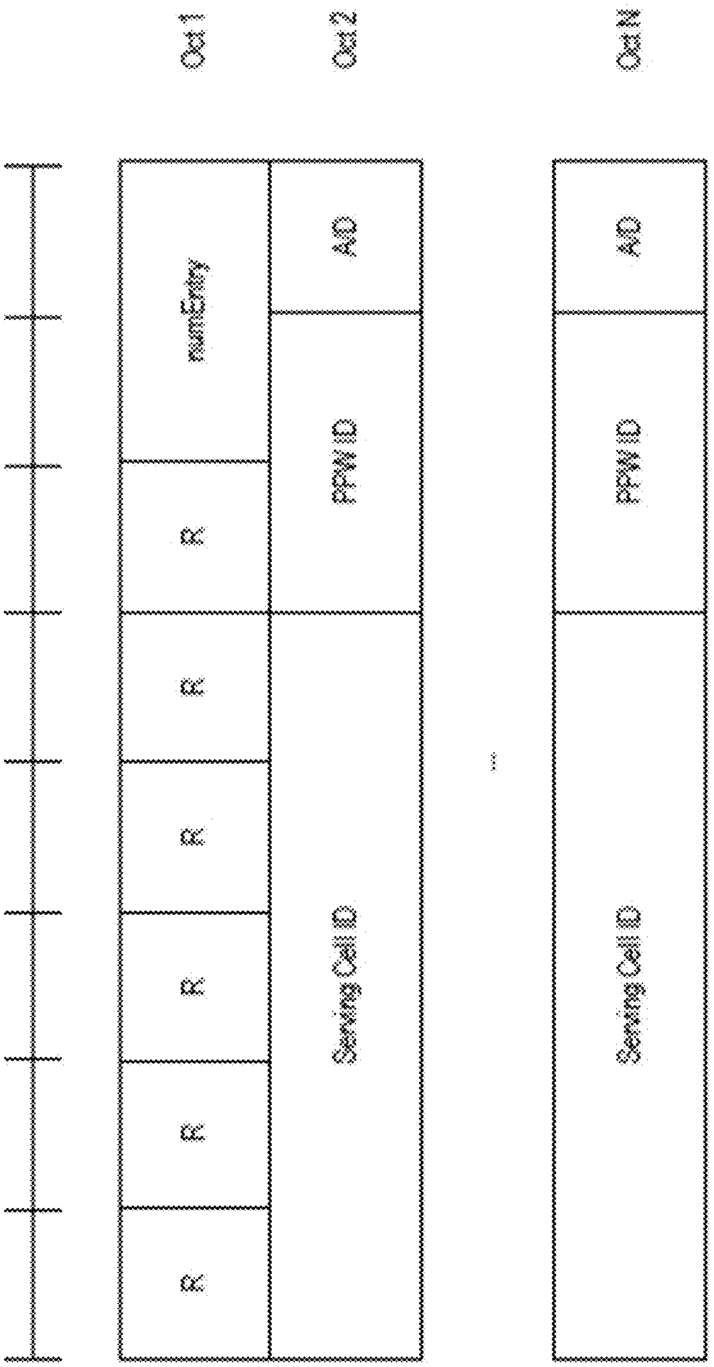
FIG. 13 illustrates an example implementation of a positioning reference signal (PRS) resource (set) with a medium access control (MAC) control element (MAC CE), in accordance with some embodiments of the present disclosure.

A network (e.g., gNB) can indicate which PRS processing window (PPW) on a serving cell/carrier is activated/de-activated with a MAC CE as shown in FIG. 13. The field "numEntry" may indicate number of entries (of "Serving Cell ID"+"PPW ID"+"A/D" in an octet). The "Serving Cell ID" field may indicate the PPW on which serving cell can be activated/de-activated. The "PPW ID" field may indicate which PPW can be activated/de-activated (e.g., by setting the field "A/D" as "1" for activation).

A gNB can configure multiple non-overlapping (in time) PPW (e.g., 4 PPW). If the first "R" field (or the second "R" field, or the sixth "R" field, or other "R" field) is set as "1", the PRS can be aggregated. Optionally, if the first "R" field is set as "1", the PRS indicated by the field "Serving Cell ID" may be aggregated. Optionally, if the first "R" field is set as "1" and the field "A/D" is set as "1", the PRS indicated by the field "Serving Cell ID" may be aggregated.

In some embodiments, the PPW can be configured for one carrier (e.g., the first serving cell, indicated by the "Serving Cell ID" field) while there is no PPW on other carrier(s) (e.g., not configured). Under this circumstance, this PPW may be applied to all the aggregated carriers (or cells). Optionally, the aggregated carriers can be indicated by one or more "R" fields as a previous example. These carriers may share the same PPW. Optionally, under this circumstance, the PPW association between carriers (cells) can be given (e.g., indicated by one or more "R" field on this MAC CE).

In some embodiments, for aggregated carriers (or cells), (only) one PPW can be applied to these carriers (e.g., the PPW for the first carrier is selected or, a PPW indicated by this MAC CE or, a "R" field on this MAC CE). Optionally, for aggregated carriers (or cells) for PRS, (only) one PPW can be effective (e.g., the first PPW, a PPW with PPW ID=0) while the other PPW may not be effective. This can be indicated by "R" field. Optionally, for aggregated carriers (or cells) for PRS, (only) one PPW can be effective (e.g., the first PPW, a PPW with PPW ID=0) while the other PPW may not be effective even it/they were configured.

In some embodiments, when multiple PFL/carriers/cells/serving cells are aggregated where each PFL/carrier/cell/serving cell is configured with a PPW, if one PPW is activated (e.g., being indicated by a field "A/D" with "1", or a field "R" with "1") for a PFL/carrier/cell/serving cell while other PPW on respective PFL/carriers/cells/serving cells are not activated (e.g., being indicated by a field "A/D" with "0", or a field "R" with "0"), the activated PPW can be applied for all PFL/carriers/cells/serving cells being aggregated. In some embodiments, when multiple PFL/carriers/cells/serving cells are aggregated where each PFL/carrier/cell/serving cell is configured with a PPW, if one PPW is activated for a PFL/carrier/cell/serving cell while other PPW on respective PFL/carriers/cells/serving cells are not activated, the activated PPW can be shared by other PFL/carriers/cells/serving cells being aggregated.

In some embodiments, when multiple PFL/carriers are aggregated, a carrier aggregation specific PPW is applied for all the aggregated carriers. Within this PPW, all the PFL/carriers configured for a UE can be measured. Optionally, within this PPW, all the PFL/carriers configured for a UE can be measured at the same time. Optionally, within this PPW, all the PFL/carriers aggregated for a UE can be measured. Optionally, within this PPW, all the PFL/carriers aggregated for a UE can be measured at the same time.

A carrier aggregation specific PPW may include at least one of: a PPW ID, a number of aggregated PFL/carriers/cells/serving cells (e.g., 3 carriers), a list of aggregated PFL/carriers/cells/serving cells ID, a PPW offset (e.g., relative to system frame number 0, SFN #0, slot #0), a PPW length (e.g., 20 slots), a PPW repetition period (e.g., 40 ms), a PPW type (e.g., intra-band, inter-band), a priority of other DL signal/channel or priority of PRS (e.g., which signal can be processed first, which one can be dropped if conflict happens). With this method, the SRS carrier aggregation can be indicated without additional signaling overhead while the spatial relation for SRS resource can still be maintained.

Implementation Example 7

When a UE performs positioning related measurement (e.g., time difference of arrival, TDOA), the UE can use a timing error group (TEG). A TEG can be a group of antenna/antennas. In some embodiments, the TEG can have one antenna. Different TEG can have different antenna/antennas. A TEG may include Rx TEG for reception, Tx TEG for transmission, and/or Rx-Tx TEG for reception and transmission.

When two or more carriers are aggregated, the identical TEG can be applied for all these aggregated carriers. Optionally, a UE (or a gNB, or a TRP) can be requested by a network (e.g., a LMF) to apply the same TEG when measuring for all the aggregated carriers (or the whole of the aggregated carriers). Optionally, a TEG with minimum timing error can be selected/applied for all the aggregated carriers. Optionally, a TEG can be selected/applied for all the carrier(s) which the TEG is indicated by a network (e.g., a gNB). Optionally, a TEG can be selected/applied for all the carrier(s) which the TEG is indicated by a network with a TEG ID (e.g., a Rx TEG ID for reception/measurement, a Tx TEG ID for transmission). Optionally, a TEG can be indicated by a network (e.g., a gNB) for all the aggregated carriers. Optionally, a TEG with minimum timing error can be indicated by a network (e.g., a gNB) for all the aggregated carriers.

In some embodiments, for each carrier/cell, a UE can select an Rx TEG for PRS measurement, and each Rx TEG can be different. Optionally, for each carrier/cell, a UE can select a Tx TEG for SRS transmission, and each Tx TEG can be different.

In some embodiments, a TEG for a carrier/cell with the lowest frequency can be applied for all the aggregated carriers. Optionally, a TEG for a carrier/cell with the lowest frequency can be applied for the whole of the aggregated carriers. Optionally, for PRS reception, a Rx TEG for a carrier/cell with the lowest frequency can be applied for all the aggregated carriers. Optionally, for SRS transmission, a Tx TEG for a carrier/cell with the highest frequency can be applied for all the aggregated carriers where the frequency can be determined by absolute radio frequency channel number (ARFCN).

In some embodiments, a TEG for a carrier/cell with the largest bandwidth can be applied for all the aggregated carriers. Optionally, a TEG for a carrier/cell with the smallest bandwidth can be applied for all the aggregated carriers. Optionally, a TEG for a carrier/cell on the center of aggregated carriers can be applied for all the aggregated carriers. Optionally, a TEG for the primary component carrier/cell (PCC, primary serving cell) can be applied for all the aggregated carriers. Optionally, a TEG (e.g., a carrier aggregation specific TEG) for a first carrier/cell (e.g., a carrier with a carrier ID=0, or a carrier with the lowest carrier ID) can be applied for all the aggregated carriers. Optionally, a TEG (e.g., a carrier aggregation specific TEG) for aggregated carriers can be defined (and applied) which the timing error is measured over the aggregated carriers for this TEG. Optionally, a carrier aggregation specific TEG can be applied for all the aggregated carriers.

In some embodiments, a TEG with the closest timing error can be selected/applied for aggregated carriers/cells. For example, for 3 carriers to be aggregated, the timing error of TEG for these 3 carriers can be 0.15 ns, 0.11 ns, 0.18 ns (where the closest/center-most/most-focused value is 0.15 ns). A TEG with a timing error of 0.15 ns (the closest one) can be selected/applied for aggregated carriers/cells.

When a UE (or a gNB, or a TRP) report measurement result(s) for the aggregated carriers, the UE may attach the Rx TEG ID. In some embodiments, a UE can report its capability on TEG with carrier aggregation (e.g., TEG ID with timing error over aggregated carriers). Optionally, a UE can report its capability on TEG with carrier aggregation over the whole of the aggregated carriers (e.g., TEG ID with timing error over aggregated carriers). Optionally, a UE can report it capability on how many carriers it can measure on aggregated PRS (e.g., 2 carriers). Optionally, a UE can report it capability on how many carriers it can transmit on aggregated SRS. Optionally, a UE can report it capability on total bandwidth of aggregated PRS/SRS (e.g., 100+100+100=300 MHz, 3 contiguous 100 MHz). In some embodiments, a UE can report its capability on measurement period with carrier aggregation (e.g., how many PRS symbols it can process with a time period).

With this method, the PRS/SRS with carrier aggregation can be measured/transmitted with least timing error by selection/indication of an appropriate TEG. Hence, the positioning accuracy can be ensured with minimum error.

Implementation Example 8

When a UE performs positioning related measurement (e.g., time difference of arrival, TDOA), the UE can use a phase error group (PEG). A PEG can be a group of antenna/antennas. In some embodiments, the PEG can have one antenna. Different PEG can have different antenna/antennas. A PEG may include Rx PEG for reception, Tx PEG for transmission, and/or Rx-Tx PEG for reception and transmission.

When two or more carriers are aggregated, the identical PEG can be applied for all these aggregated carriers. Optionally, a UE (or a gNB, or a TRP) can be requested by a network (e.g., a LMF) to apply the same PEG when measuring for all the aggregated carriers.

In some embodiments, a PEG with minimum phase error can be selected/applied for all the aggregated carriers. Optionally, a PEG can be selected/applied for all the carrier(s) which the PEG is indicated by a network (e.g., a gNB). Optionally, a PEG can be selected/applied for all the carrier(s) which the PEG is indicated by a network with a PEG ID (e.g., a Rx PEG ID for reception/measurement, a Tx PEG ID for transmission). Optionally, a PEG can be indicated by a network (e.g., a gNB) for all the aggregated carriers. Optionally, a PEG with minimum phase error can be indicated by a network (e.g., a gNB) for all the aggregated carriers.

Optionally, for each carrier/cell, a UE can select a Rx PEG for PRS measurement, and each Rx PEG can be different. Optionally, for each carrier/cell, a UE can select a Tx PEG for SRS transmission, and each Tx PEG can be different. Optionally, for each carrier/cell, a gNB (or TRP) can select a Tx PEG for PRS transmission, and each Tx PEG can be different.

Optionally, a PEG for a carrier/cell with the lowest frequency can be applied for the whole of the aggregated carriers. Optionally, a PEG for a carrier/cell with the lowest frequency can be applied for all the aggregated carriers. Optionally, for PRS reception, a Rx PEG for a carrier/cell with the lowest frequency can be applied for all the aggregated carriers. Optionally, for SRS transmission, a Tx PEG for a carrier/cell with the highest frequency can be applied for all the aggregated carriers where the frequency can be determined by ARFCN. Optionally, a PEG for a carrier/cell with the largest bandwidth can be applied for all the aggregated carriers. Optionally, a PEG for a carrier/cell with the smallest bandwidth can be applied for all the aggregated carriers. Optionally, a PEG for a carrier/cell on the center of aggregated carriers can be applied for all the aggregated carriers. Optionally, a PEG for the PCC (or, primary serving cell) can be applied for all the aggregated carriers.

Optionally, a PEG (e.g., a carrier aggregation specific PEG) for a first carrier/cell (e.g., a carrier with a carrier ID=0, or a carrier with the lowest carrier ID) can be applied for all the aggregated carriers. Optionally, a PEG (e.g., a carrier aggregation specific PEG) for aggregated carriers can be defined (and applied) which the phase error is measured over the aggregated carriers for this PEG. Optionally, a carrier aggregation specific PEG can be applied for all the aggregated carriers.

In some embodiments, a PEG with the closest phase error can be selected/applied for aggregated carriers/cells. For example, for 3 carriers to be aggregated, the phase error of PEG for these 3 carriers can be 0.14 Rad, 0.12 Rad, 0.19 Rad (where the closest/center-most/most-focused value is 0.14 Rad). A PEG with a phase error of 0.14 Rad (the closest one) can be selected/applied for aggregated carriers/cells. When a UE (or a gNB, or a TRP) reports measurement result(s) for the aggregated carriers, the UE may attach the Rx PEG ID.

In some embodiments, a UE can report its capability on PEG with carrier aggregation (e.g., PEG ID with phase error over aggregated carriers). With this method, the PRS/SRS with carrier aggregation can be measured/transmitted with least phase error by selection/indication of an appropriate PEG. Hence, the positioning accuracy can be ensured with minimum error.

Implementation Example 9

This implementation example takes a DL-PRS as description. The principle can also be applied to a UL-SRS.

Figure 14:
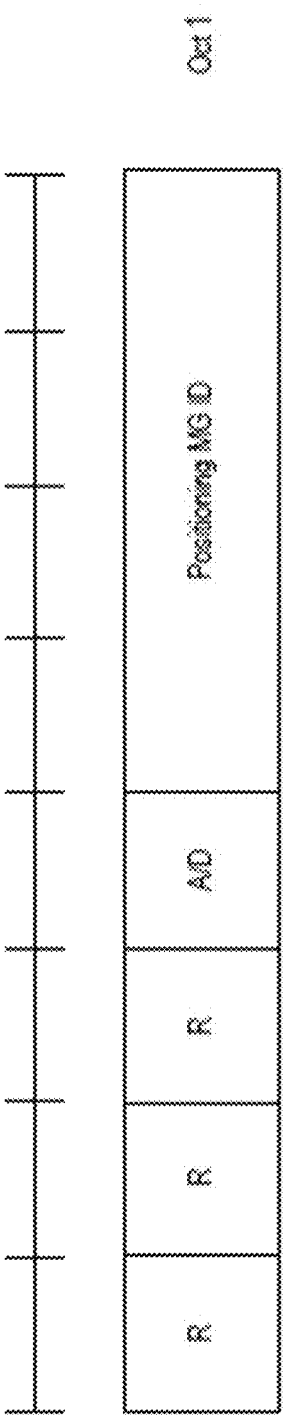
FIG. 14 illustrates an example implementation of a medium access control (MAC) control element (MAC CE), in accordance with some embodiments of the present disclosure.

A network (e.g., gNB) can indicate which PRS measurement gap (MG) on a serving cell/carrier is activated/deactivated with a MAC CE as shown in FIG. 14. In addition, a UE can send this format of MAC CE for requesting a measurement gap (MG). The field “Positioning MG ID” may indicate the identity for the pre-configured positioning measurement gap.

If the first “R” field (or the second “R” field, or the third “R” field) is set as “1”, the PRS may be aggregated. Optionally, the “R” field may indicate the carrier aggregation of PRS as the following tables (table 4 and table 5).

TABLE 4

| The first field “R” | The second field “R” | The third field “R” | Function |
|---|---|---|---|
| 0 | 0 | 0 | Reserved or not available (N/A). No carrier aggregation of PRS. |
| 0 | 0 | 1 | A sub-set of the carriers may be transmitted at the same time (e.g., carrier #1 and carrier #0). |
| 0 | 1 | 0 | A sub-set of the carriers may be transmitted at the same time (e.g., carrier #2, #1, #0). |
| 0 | 1 | 1 | A sub-set of the carriers may be transmitted at the same time (e.g., carrier#3, #2, #1, #0). |
| 1 | 0 | 0 | A sub-set of the carriers may be transmitted at the same time (e.g., carrier#4, #3, #2, #1, #0). |
| 1 | 0 | 1 | A sub-set of the carriers may be transmitted at the same time (e.g., carrier#5, #4, #3, #2, #1, #0). |
| 1 | 1 | 0 | A sub-set of the carriers may be transmitted at the same time (e.g., carrier#6, #5, #4, #3, #2, #1, #0). |
| 1 | 1 | 1 | All the carriers that carry PRS may be transmitted at the same time. |

TABLE 5

| | Function |
|---|---|
| The first field “R” | “0” for reserved or not available (N/A). “1” for the first carrier may be aggregated. |
| The second field “R” | “0” for reserved or not available (N/A). “1” for the second carrier may be aggregated. |
| The third field “R” | “0” for reserved or not available (N/A). “1” for the third carrier may be aggregated. |

In some embodiments, if the “R” field is set as “1” and the “A/D” field is set as “1”, the PRS may be aggregated. Optionally, if the “R” field is set as “1”, the PRS associated with the field “Positioning MG ID” may be aggregated. Optionally, if the “R” field is set as “1” and the “A/D” field is set as “1”, the PRS associated with the field “Positioning MG ID” may be aggregated. Optionally, a codepoint can indicate which carrier that carries PRS may be transmitted at the same time.

In some embodiments, a UE can be configured with multiple PFL/carriers for PRS/SRS. Optionally, only one MG can be configured for these PFL/carriers (e.g., on the first PFL, or a PFL with cell ID=0). Optionally, only one MG can be configured for a PFL/carrier while the other PFL/carrier(s) may not be configured with MG, then this MG can be applied for all these PFL/carriers. Optionally, only one MG can be configured for a PFL/carrier while the other PFL/carrier(s) may not be configured with MG, then this MG can be applied for all these PFL/carriers when all these PFL/carriers are aggregated. Optionally, only one MG can be configured for a PFL/carrier while the other PFL/carrier(s) may not be configured with MG, then this MG can be applied for all these PFL/carriers when all these PFL/carriers are transmitted. Optionally, when these multiple PFL/carriers are aggregated, this MG can be applied for all these PFL/carriers. Optionally, when these multiple PFL/carriers are transmitted at the same time, this MG can be applied for all these PFL/carriers.

In some embodiments, when these multiple PFL/carriers with one MG on each PFL/carrier are aggregated, the MG on the first PFL/carrier can be applied (e.g., being effective) while the MG on other PFL/carrier(s) may not be effective (e.g., not being applied).

In some embodiments, when multiple PFL/carriers/cells/serving cells are aggregated where each PFL/carrier/cell/serving cell is configured with a MG, if one MG is activated (e.g., being indicated by a field "A/D" with "1", or a field "R" with "1") for a PFL/carrier/cell/serving cell while other MG on respective PFL/carriers/cells/serving cells are not activated (e.g., being indicated by a field "A/D" with "0", or a field "R" with "0"), the activated MG can be applied for all PFL/carriers/cells/serving cells being aggregated.

In some embodiments, when multiple PFL/carriers/cells/serving cells are aggregated where each PFL/carrier/cell/serving cell is configured with a MG, if one MG is activated for a PFL/carrier/cell/serving cell while other MG on respective PFL/carriers/cells/serving cells are not activated, then the activated MG can be shared by other PFL/carriers/cells/serving cells being aggregated.

When multiple PFL/carriers are aggregated, a carrier aggregation specific MG can be applied for all the aggregated carriers. Within this MG, all the PFL/carriers configured for a UE can be measured. Optionally, within this MG, all the PFL/carriers configured for a UE can be measured at the same time. Optionally, within this MG, all the PFL/carriers aggregated for a UE can be measured. Optionally, within this MG, all the PFL/carriers aggregated for a UE can be measured at the same time.

In some embodiments, a carrier aggregation specific MG may include at least one of: a MG ID, a number of aggregated PFL/carriers/cells/serving cells (e.g., 3 carriers), a list of aggregated PFL/carriers/cells/serving cells ID, a MG offset (e.g., relative to system frame number 0, SFN #0, slot #0), a MG length (e.g., 10 slots), a MG repetition period (e.g., 20 ms), a MG type (e.g., intra-band, inter-band), or a priority of other DL signal/channel or priority of PRS (e.g., which signal will be processed first).

With this method, the PRS carrier aggregation can be indicated without additional signaling overhead while the measurement gap for PRS can still be maintained.

It should be understood that one or more features from the above implementation examples are not exclusive to the specific implementation examples, but can be combined in any manner (e.g., in any priority and/or order, concurrently or otherwise).

Figure 15:
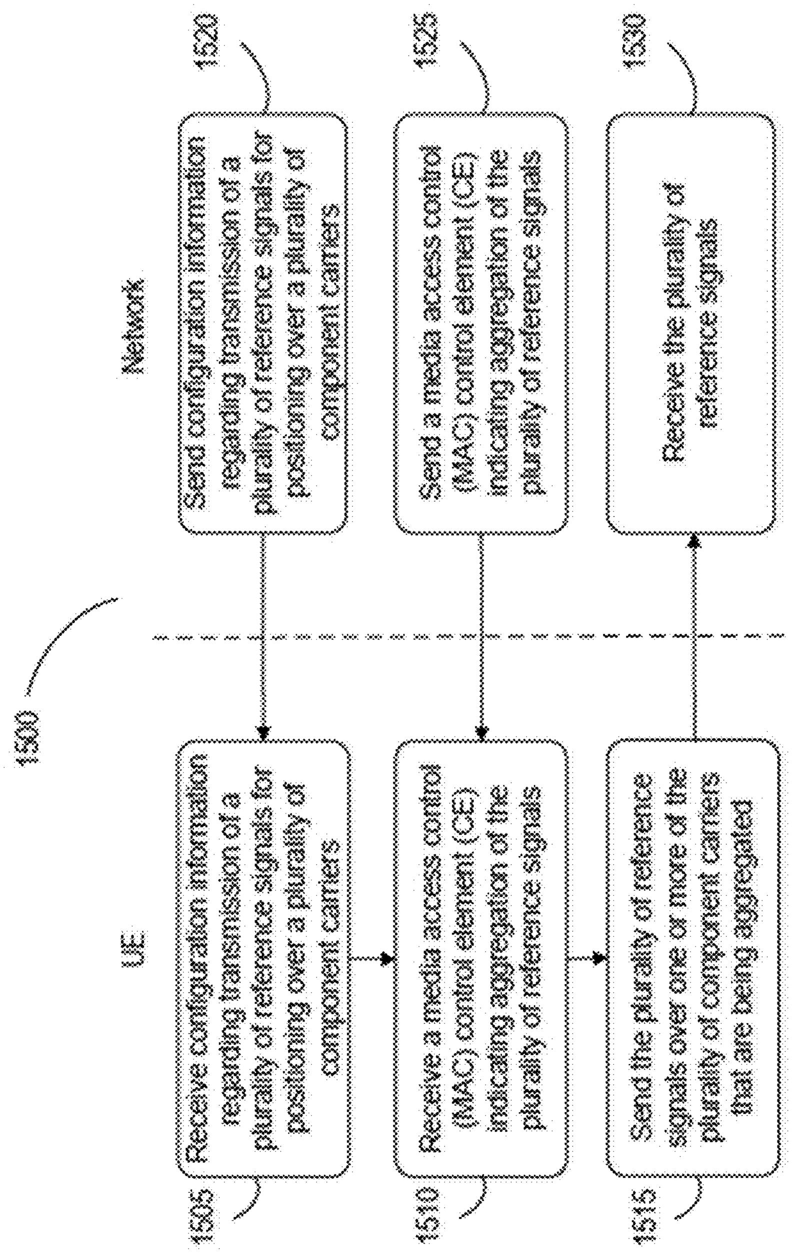
FIG. 15 illustrates a flow diagram of an example method for carrier aggregation based positioning, in accordance with an embodiment of the present disclosure.

FIG. 15 illustrates a flow diagram of a method 1500 for carrier aggregation based positioning. The method 1500 may be implemented using any one or more of the components and devices detailed herein in conjunction with FIGS. 1-14. In overview, the method 1500 may be performed by a wireless communication device (e.g., a UE), in some embodiments. Additional, fewer, or different operations may be performed in the method 1500 depending on the embodiment. At least one aspect of the operations is directed to a system, method, apparatus, or a computer-readable medium.

A user equipment (UE) may receive configuration information regarding transmission of a plurality of reference signals for positioning over a plurality of component carriers from a network. The UE may receive a media access control (MAC) control element (CE) indicating aggregation of the plurality of reference signals from the network. The UE may send the plurality of reference signals over one or more of the plurality of component carriers that are being aggregated to the network. The MAC CE may include an "R" field. When the R field is set to "1," the plurality of reference signals on multiple activated SRS resources over the plurality of component carries can be configured to be transmitted at a same time.

In some embodiments, the MAC CE may include an "R" field. When the R field is set to "1," the plurality of reference signals on multiple activated SRS resources over a subset of the plurality of component carries can be configured to be aggregated.

In some embodiments, the MAC CE may include an "R" field. When the R field is set to "1," the plurality of reference signals on multiple activated SRS resources over all of the plurality of component carries can be configured to be aggregated.

In some embodiments, the MAC CE may include an "R" field. When the R field is set to "1," the plurality of reference signals on multiple activated SRS resource sets over a subset of the plurality of component carries can be configured to be transmitted at a same time. Respective spatial relations of the subset of the component carriers can be also indicated by the MAC CE.

In some embodiments, the MAC CE may include an "R" field and an "SUL" field. The R field and the SUL field can be configured to indicate which of the plurality of component carries that carry an SRS are configured to be transmitted at a same time. The MAC CE may include an "R" field and an "SUL" field. The R field can be configured to indicate whether to aggregate the one or more component carriers. The SUL field can be configured to indicate a number of the one or more aggregated component carriers.

In some embodiments, the MAC CE may include a "Positioning SRS Resource Set ID" field. Spatial relations of all of the plurality of reference signals can be indicated by the Positioning SRS Resource Set ID field. The MAC CE may include a "Resource IDi" field. When a first bit of the Resource IDi is set to "1," the plurality of component carriers can be configured to be transmitted at a same time.

In some embodiments, the MAC CE may include an "SRS Resource Set ID" field and a "Pathloss Reference RS ID" field. A first one of the plurality component carriers indicated by the SRS Resource Set ID field and a second one of the plurality component carriers indicated by the Pathloss Reference RS ID field can be configured to be aggregated. The MAC CE may include an "R" field, an "SRS Resource's Cell ID" field, and/or a "Serving Cell $ID_i$" field. When the R field on a first octet is set to "1," a first one of the plurality component carriers associated with the SRS Resource's Cell ID field and a second one of the plurality component carriers associated with the Serving Cell $ID_i$ field can be configured to be aggregated.

In some embodiments, the MAC CE may include a first "R" field on a first octet and a second "R" field on a second octet. The first R field and the second R field can be configured to indicate the one or more aggregated component carriers. The MAC CE may include five "R" fields that start an octet and three "$C_i$" fields that end the octet. Each of the five R fields can be set as "0" for reserved bits. Each of the three $C_i$ fields can be set as "1" for indicating a corresponding one of the component carriers to be aggregated.

In some embodiments, the MAC CE may include an "R" field, an "A/D" field, and/or a "Serving Cell ID" field. When the R field is set to "1" and the A/D field is set to "1," a component carrier indicated by the Serving Cell ID field can be configured to be aggregated The configuration information may indicate that if a measurement gap (MG) is configured for a first one of the component carriers while no MG is configured for other ones of the component carriers, the MG can be configured to be applied to the one or more aggregated component carriers.

In some embodiments, the configuration information may indicate that only one PPW is effective while other PPWs are not effective. Each of the one or more aggregated component carriers can be configured with a respective PPW. The configuration information may indicate if only one PPW is configured for a PFL while other PFLs are not configured with PPW, the configured PPW can be applied for all PFLs being aggregated. Each of the aggregated one or more component carries may have a first identification for data transmission and a second identification for positioning.

In some embodiments, the configuration information may indicate a TEG for a primary component carrier (PCC), or a primary serving cell applied for the one or more aggregated component carriers. The configuration information may indicate a carrier aggregation specific TEG applied for the one or more aggregated component carriers. The configuration information may include a UE capability report indicating a TEG applied for a whole of the one or more aggregated component carriers. The configuration information may indicate a PEG with minimum phase error applied for all the one or more aggregated component carriers. The configuration information may include a UE capability report indicating a PEG applied for all of the one or more aggregated component carriers.

In some embodiments, the configuration information may indicate that when multiple PFLs, each of which is with one MG, are aggregated, the MG on a first one of the PFLs can be applied while the MGs on the other PFLs are not effective. The configuration information may indicate if one PPW is activated for a PFL while other PPWs on respective PFLs are not activated, the activated PPW can be applied for all PFLs being aggregated.

In some embodiments, the configuration information may indicate that when multiple PFLs, each of which is with one MG, are aggregated, the MG on a first one of the PFLs can be shared by other PFLs being aggregated while the MGs on the other PFLs may not be effective. The configuration information may indicate if one PPW is activated for a PFL while other PPWs on respective PFLs are not activated, the activated PPW can be shared by other PFLs being aggregated.

In some embodiments, a wireless communication node may determine configuration information regarding transmission of a plurality of reference signals for positioning over a plurality of component carriers. The wireless communication node may measure the plurality of reference signals. The wireless communication node may report a measurement result on the plurality of reference signals over one or more of the plurality of component carriers that are being aggregated. The wireless communication node may transmit a media access control (MAC) control element (CE) that has one or more "R" fields indicating aggregation of the plurality of reference signals.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method for positioning, comprising:

receiving, by a user equipment (UE) from a network, configuration information regarding transmission of a plurality of reference signals for positioning over a plurality of component carriers;

receiving, by the UE from the network, a media access control (MAC) control element (CE) indicating aggregation of the plurality of reference signals; and sending, by the UE to the network, the plurality of reference signals over one or more of the plurality of component carriers that are being aggregated, wherein the MAC CE indicates that the plurality of reference signals on at least one activated sounding reference signal (SRS) resource set over the plurality of component carriers are configured to be transmitted at a same time.

2. The wireless communication method according to claim 1, wherein the MAC CE indicates a subset of the plurality of component carriers are configured to be aggregated.

3. The wireless communication method according to claim 1, wherein the MAC CE indicates all of the plurality of component carriers are associated to be aggregated.

4. The wireless communication method according to claim 1, wherein the MAC CE includes a "Spatial Relation for Resource $ID_i$" field for a spatial relation of a resource ID i.

5. The wireless communication method according to claim 1, wherein the MAC CE indicates a subset of the plurality of component carriers that are associated to be transmitted at a same time.

6. The wireless communication method according to claim 1, wherein the MAC CE includes three "$C_i$" fields, wherein each of the three $C_i$ fields is set to "1" for indicating that the plurality of reference signals on the SRS resource set are activated and are to be aggregated.

7. The wireless communication method according to claim 1, wherein the MAC CE activates or deactivates one or more sounding reference signal (SRS) resource sets over the plurality of component carriers.

8. The wireless communication method according to claim 1, wherein the MAC CE includes a "A/D" field that indicates whether to activate or deactivate a semi-persistence (SP) positioning sounding reference signal (SRS) resource set over the plurality of component carriers.

9. The wireless communication method according to claim 1, wherein the MAC CE includes a "Resource Serving Cell $ID_i$" field indicating the plurality of reference signals on the at least one activated SRS resource set over the plurality of component carriers.

10. The wireless communication method according to claim 1, wherein the MAC CE includes octets and a "C" field that indicates whether the octets including a "Resource Serving Cell ID" field and a "Resource BWP ID" field within a "Spatial Relation for Resource ID i" field is present.

11. The wireless communication method according to claim 1, wherein the MAC CE indicates which of at least one of: a plurality of PFL, the plurality of component carriers, or a plurality of cells are associated to be aggregated.

12. The wireless communication method according to claim 1, wherein the MAC CE indicates which of at least one of: a plurality of PFL, the plurality of component carriers, or a plurality of cells are associated to be transmitted at a same time.

13. A user equipment (UE), comprising:

at least one processor configured to:

receive, via a transceiver from a network, configuration information regarding transmission of a plurality of reference signals for positioning over a plurality of component carriers;

receive, via the transceiver from the network, a media access control (MAC) control element (CE) indicating aggregation of the plurality of reference signals; and send, via the transceiver to the network, the plurality of reference signals over one or more of the plurality of component carriers that are being aggregated, wherein the MAC CE indicates that the plurality of reference signals on at least one activated sounding reference signal (SRS) resource set over the plurality of component carriers are configured to be transmitted at a same time.

14. A wireless communication method, comprising:

determining, by a wireless communication node, configuration information regarding transmission of a plurality of reference signals for positioning over a plurality of component carriers;

measuring, by the wireless communication node, the plurality of reference signals; and reporting, by the wireless communication node, a measurement result on the plurality of reference signals over one or more of the plurality of component carriers that are being aggregated, wherein the MAC CE indicates that the plurality of reference signals on at least one activated sounding reference signal (SRS) resource set over the plurality of component carriers are configured to be transmitted at a same time.

15. The wireless communication method according to claim 14, wherein the MAC CE indicates a subset of the plurality of component carriers that are associated to be transmitted at a same time.

16. The wireless communication method according to claim 14, wherein the MAC CE includes three "$C_i$" fields, wherein each of the three $C_i$ fields is set to "1" for indicating that the plurality of reference signals on the SRS resource set are activated and are to be aggregated.

17. The wireless communication method according to claim 14, wherein the MAC CE activates or deactivates one or more sounding reference signal (SRS) resource sets over the plurality of component carriers.

18. The wireless communication method according to claim 14, wherein the MAC CE includes a "A/D" field that indicates whether to activate or deactivate a semi-persistence (SP) positioning sounding reference signal (SRS) resource set over the plurality of component carriers.

19. The wireless communication method according to claim 14, wherein the MAC CE includes a "Resource Serving Cell $ID_i$" field indicating the plurality of reference signals on the at least one activated SRS resource set over the plurality of component carriers.

20. A network node, comprising:

at least one processor configured to:

determine configuration information regarding transmission of a plurality of reference signals for positioning over a plurality of component carriers;

measure the plurality of reference signals; and report, via a transmitter, a measurement result on the plurality of reference signals over one or more of the plurality of component carriers that are being aggregated, wherein the MAC CE indicates that the plurality of reference signals on at least one activated sounding reference signal (SRS) resource set over the plurality of component carriers are configured to be transmitted at a same time.

* * * * *